Patented Oct. 19, 1954

2,692,287

UNITED STATES PATENT OFFICE 2,692,287

PRODUCTION OF N-TERTIARY-ALKYLATED AROMATIC SECONDARY MONOAMINES

Alan Beil and M B Knowles, Kingsport, Tenn., assignors to Eastman Kodak Company, Rochester, N. Y., a corporation of New Jersey No Drawing. Application March 29, 1951,
Serial No. 218,262

10 Claims. (Cl. 260—574)

This invention relates to mono-tertiary-alkyl aromatic monoamines and methods for production thereof. More particularly, it relates to alkylations in which a saturated tertiary alkyl group containing 4 to 8 carbon atoms is substituted in an amino group of an aromatic amine to produce a secondary amine. It especially contemplates the preparation of mono-tertiary-butyl aniline and mono-tertiary-butyl substituted anilines by the reaction of the corresponding primary amines with tertiary butyl alcohol in the presence of catalysts.

It is known to react primary and secondary alcohols with primary aromatic amines to form corresponding N-alkyl substituted amines. Unless very special conditions of reactions are observed, however, the tertiary amines are formed in these processes, that is, dialkylation of the amine group takes place. In addition, alkylation of the aromatic nucleus may be effected particularly if elevated temperatures are employed. Thus, a mixture of products is obtained, reducing the yield of monoalkylated amine product, and necessitating the use of special separation procedures to remove the secondary amine product (monoalkylated) from the tertiary amine product (dialkylated), the unreacted primary amine, and any nuclearly alkylated amine products.

In past proposals, tertiary amine products are always obtained when large mole ratios of primary or secondary alcohols to primary aromatic amines or their hydro-halide salts are employed in the reaction. Then to obtain good yields of secondary amines from primary amines by alkylation, this ratio has been generally kept at 2 to 1 or lower. Even at these low ratios unless special conditions of reaction are observed, dialkylated or tertiary amines result. For example, Staedel, German Patent 21,241, dated February 3, 1882, obtained near quantitative yields of N,N-diethyl-aniline, N,N-diethylorthotoluidine and N,N-diethylparatoluidine by heating ethyl alcohol with the corresponding primary amine hydroiodides at 145° C. to 150° C. In these procedures the mole ratio of ethyl alcohol to amine was kept at 1.1 to 1. Essentially the same results were obtained when the amine hydrobromides were employed. Reilly and Hickinbottom, J. Chem. Soc. 113, (1918) 102,976, obtain the products N-monobutylaniline, N,N-dibutylaniline, and p-butylaniline from the reaction of aniline hydrochloride with normal butyl alcohol. Carleton et al. in U. S. Patent 1,994,852 obtained mixtures of mono-N-alkylated and di-N-alkylated "aromatic amines" using primary and secondary alcohols by following restricted conditions such as forming a partial amine salt by reaction of a mole of primary amine with 0.6 to 0.9 moles of hydrochloric acid and then alkylating with 1.9 to 2.4 moles of a primary or secondary alcohol. In our process for the preparation of N-tertiary alkylated aryl amines, we obtain no complexity of products. Good yields of the secondary amine products are obtained without formation of tertiary amine products even where very high mole ratios of tertiary alcohols to primary aromatic amines are employed. In addition, we have found no nuclearly alkylated aromatic amine products and we have discovered that we do not have to limit our mole ratio of mineral acid catalyst to amine group at 0.6:1 to 0.9:1. In fact, our preferred conditions for reaction, as will be described hereinafter, call for a mole ratio of tertiary alcohol to amine of greater than 2:1 and a ratio of hydrohalogenic acid to amine of 1:1.

Tertiarybutyl alcohol and other tertiary alcohols have not been employed heretofore in the preparation of N-alkylated aromatic secondary amines. It was to be expected prior to our discovery that excessive dehydration of the tertiary alcohol would result under the conditions of reaction and it was also expected that mixtures of secondary and tertiary amine products would result. The methods employed in the past to prepare N-tertiary-butylamine for example, call for the use of aniline and tertiary-butyl iodide. This procedure which is described by Hickinbottom, J. Chem. Soc. 1933, 946, is attended with certain deficiencies, such as low yields of desired product, instability of tertiary-alkyl iodides under basic conditions, and the use of tertiary-alkyl iodides which are relatively expensive laboratory reagents. Hickinbottom's process, although well adapted for laboratory preparation, cannot be considered of commercial utility in view of the last-mentioned feature. Further, we have found this reaction to be so exothermic that reduced yields of products are obtained when large amounts of reactants are used.

A principal purpose of this invention is to provide a new and improved method for producing N-tertiary-alkylated aromatic secondary monoamines. Another object is the production of N-tertiary-alkyl aromatic amines, particularly those with tertiary-alkyl groups containing 4 to 8 carbon atoms by an easily controlled process which is characterized by its flexibility. A further object of the invention is the production of tertiary-alkylated secondary amines from primary aromatic amines in such a manner that the reaction product contains no tertiary-alkylated tertiary amine groups, or in other words, that the primary amine group of the aromatic amine is mono-alkylated and not di-alkylated by the process. It is a still further object to provide a process for produtcion of oxygen resistant, color-stable N-tertiary-butylated monoamines from aniline and substituted anilines. More particularly, it is an object to supply processes for production of N-tertiary-butyl-p-aminophenol and N - tertiary - butyl - p - nitroalinine. Other objects of the invention will become apparent hereinafter.

These objects are accomplished according to to invention whereby mono-tertiary-alkyl aromatic amines are produced from aromatic primary amines with a tertiary-alkyl alcohol and in the presence of acid catalyst selected from the group HCl, HBr, HI, alone or in conjunction with small amount of iodine, or the dehydrating mineral acid catalysts sulfuric acid or the oxyacids of phosphorous in conjunction with iodine, or in the presence of catalytic amounts of iodine alone. The reaction takes place under conditions of elevated temperature and pressure. The mono-tertiary-alkylated amine may be recovered in any suitable manner, and the unreacted primary amine reprocessed. The mono-tertiary-alkylated amines are useful as antioxidants or stabilizers for petroleum products and polymeric materials such as rubber. The tertiary-butylated secondary amines are particularly useful in that the amine group is stable to the effects of air and light and retains good color as compared with corresponding primary- or secondary-alkylated aromatic amines.

According to a preferred embodiment, the invention is applied to the alkylation of aniline or substituted anilines, in the form of the amine hydrochloride salts, by reacting the amine salt with tertiary-butyl alcohol in the presence of a small amount of iodine, under autogenous pressure and at elevated temperature, the reaction being so controlled as to produce only the N-tertiary-butylaniline, and not the N,N,-di-tertiary-butylaniline.

The following examples serve to illustrate our process:

Example 1.—N-tertiary-butylaniline 290 parts of aniline hydrochloride and 770 parts of tertiary butyl alcohol were heated for 5 hours at 140° to 150° C. The reaction products were dissolved in 2 liters of water and the excess alcohol removed by distillation. The solution was cooled and extracted with ether. The aqueous solution was then made basic with excess concentrated ammonium hydroxide solution and the oily products which evolved were extracted with ether. This extract was dried and the solvent removed to give 272 parts of dark liquid residue which was treated with aqueous acetic anhydride solution. After hydrolysis of excess acetic anhydride the aqueous mixture was treated with excess sodium carbonate and steam distilled. The oil layer found in the steam distillate was dried and redistilled to give 199 parts of N-tertiary-butylaniline of b. p. 208° to 211° C. and of $N_D^{20} = 1.5270$. The acetyl derivative of this material melted at 55° to 55.5° C. This particular reaction has also been carried out at temperatures from 120° to 220° C., but optimum yields appear to be produced at 135° to 155° C.

Example 2.—N-tertiary-butylaniline

Aniline hydrochloride (130 parts), tertiary butyl alcohol (370 parts), and iodine (0.5 parts) were heated at 140 to 150° C. for five hours. The reaction mixture was dissolved in water and excess alcohol was removed by distillation. Addition of ammonium hydroxide solution caused an oil to separate which was extracted with ether. The solvent was removed from this extract and the residue so produced was taken up in 300 parts of water and treated with 50 parts of acetic anhydride and allowed to set for several hours. Excess sodium carbonate was added and the mixture subjected to steam distillation. The oil layer that separated represented 83 parts of N-tertiary-butylaniline.

Example 3.—N-tertiary-butyl-p-nitroaniline

P-nitroaniline (69 parts), tertiary butyl alcohol (222 parts) and iodine (0.5 parts) were heated at 170° to 180° C. for five hours in a shaking type steel autoclave. The autoclave was rinsed out with acetone and the reaction mixture was distilled until its temperature reached 100° C. The residue so produced was extracted three times with boiling benzene which dissolved part of the unreacted p-nitroaniline and all of the desired product. The unreacted p-nitroaniline was separated from the benzene extract by adding an equal volume of hexane and filtering. A red oily material was obtained from the filtrate on evaporation which was converted to the nitroso derivative by dissolving in dilute hydrochloric acid and adding 10 g. of sodium nitrite. The yield of N-nitroso-N-tertiary-butyl-p-nitroaniline was 9 parts. The recrystallized product melted at 137.4° to 138.6° C. Analyses calculated for $C_{10}H_{13}N_3O_3$; C, 53.8; H, 5.88; whereas analyses found C, 53.9; H, 6.01.

The above nitroso derivative was quantitatively hydrolyzed to N-tertiary-butyl-p-nitroaniline by warming with concentrated hydrochloric acid solution on a steam bath until solution resulted (approx. 5 minutes) and concentrated ammonium hydroxide solution was then added to cause separation of a red oil which slowly crystallized to a yellow solid. Upon recrystallization from aqueous alcohol solution, this product melted at 68° to 69.5° C. and analyses gave C, 61.82; H, 7.11; N, 14.47. The calculated analysis for N-tertiary-butyl-p-nitroaniline, $C_{10}H_{14}N_2O_2$ is C, 61.83; H, 7.26; N, 14.42.

Example 4.—N-tertiary-butyl-p-aminophenol

Para aminophenol hydrochloride (145 parts), tertiary butyl alcohol (370 parts), and iodine (0.5 parts) were heated together in a shaking type steel autoclave for five hours at 170–180° C. The product was diluted with water and cooled to 0° by adding crushed ice in order to remove tarry material present.

The solution was made basic with ammonium hydroxide solution and extracted with ether, the extract dried with calcium chloride and most of the solvent removed. A pink solid began to separate as the solution was concentrated. It was cooled to 5° C. and filtered. The solid was dissolved in dilute acetic and shaked with 10 parts of benzaldehyde followed by extraction with ether. The aqueous portion was made basic with ammonium hydroxide solution and the solid that separated removed by filtration; mp, 167–174° C. Repeated recrystallizations from a benzene-methanol mixture did not change the melting point; analyses calculated for $C_{10}H_{15}NO$; C, 72.69;

H, 9.15; N, 8.48; found: C, 72.69, 72.53; H, 9.13, 9.10; N, 8.16, 8.24

A further small quantity of product was obtained by distilling the ether filtrate above, dissolving in dilute acetic acid, shaking with an excess of benzaldehyde, extracting with ether, and making the aqueous portion basic. The total yield of N-tertiary-butyl-p-aminophenol was approximately 10 per cent.

This product is soluble in dilute acid and base solution and is oxidized to 1,4-benzoquinone by means of potassium bichromate at 5° C.

*Example 5.—N-tertiary-butyl-2-naphthylamine*

Beta naphthylamine hydrochloride (103 parts) and tertiary butyl alcohol (260 parts) were heated together in a shaking type steel autoclave for five hours at 150°. The product was poured into 2000 parts of water, a little hydrochloric acid added, and the mixture boiled until its temperature was 100° C. Upon cooling a large crop of nearly white crystals separated which were removed by filtration. These crystals were washed twice with water and then suspended in 1000 parts of water. An excess of ammonium hydroxide solution was added followed by extraction with ether. The ether extract was dried and distilled giving 35 parts boiling at 124° C. (2 mm.). This represented a 31 per cent conversion.

The product crystallized upon standing; M. P., 41–45°. When recrystallized from hexane it melted at 43–45° C. and was white and fluffy; analyses calculated for $C_{14}H_{17}N$; C, 84.34; H, 8.60; N, 7.04; found; C, 83.75, 84.03; H, 8.60, 8.67; N, 6.46, 6.46.

*Example 6.—N-tertiary-butyl-2,4-diaminotoluene*

Tertiary butyl alcohol (480 parts), 2,4-diaminotoluene dihydrochloride (100 parts), and iodine (0.5 parts) were heated in a shaking type steel autoclave for five hours at 150° C. The reaction mixture was poured into 1000 parts of water and unreacted alcohol was removed by boiling. The solution was cooled, made basic with sodium carbonate and extracted with ether. The ether was removed, the residue dissolved in 700 parts of water containing 80 parts of acetic acid and the solution shaken with 80 parts of benzaldehyde for five minutes. After extracting with ether, the aqueous portion was made basic and the oil layer removed with ether. The extract was dried and the solvent removed leaving 34 parts of a brown oil which crystallized upon standing. After two recrystallizations from hexane, it melted at 56.6° to 58° C. and analyzed for the mono tertiary butyl derivative $C_{11}H_{18}N_2$ which calculates C, 74.1; H, 10.17; N, 15.72. The analysis gave C, 74.18; H, 10.28; N, 14.8. The material diazotizes readily and couples with beta naphthol.

Following the general processing procedures outlined in the above examples, a series of preparations were carried out under a variety of conditions. The results are indicated in Table 1.

TABLE 1

| Moles and Amine Reacted | Moles and Alcohol Reacted | Catalyst Used | Quantity of Catalyst Used | Reaction Temperature, °C. | Conversion, percent |
|---|---|---|---|---|---|
| [1.5] aniline | [2.7] tert.-butyl alcohol | HCl | 1.5 moles | 180 | 35 |
| [4] aniline | [8] tert.-butyl alcohol | HCl | 4 moles | 180 | 16 |
| [3] aniline | [10.4] tert.-butyl alcohol | HCl | 3 moles | 150 | 59.5 |
| [4.3] aniline | [20] tert.-butyl alcohol | HCl | 4.3 moles | 150 | 62.2 |
| [1.6] aniline | [6.8] tert.-butyl alcohol | HCl | 1.6 moles | 120 | 10 |
| [1] aniline | [5] tert.-butyl alcohol | $H_2SO_4$ / Iodine | 3 g / 0.5 g | 180 | 12 |
| Do | do | HCl / Iodine | 1 mole / 0.5 g | 150 | 56 |
| Do | do | HCl / Iodine | 1 mole / 0.5 g | 130 | 43.5 |
| Do | do | Iodine | 1.5 g | 180 | 2 |
| Do | do | HBr / Iodine | 1 mole / 0.5 g | 140 | 35 |
| Do | [5] dimethylneopentyl carbinol | HCl / Iodine | 1 mole / 0.5 g | 150 | 17 |
| Do | [5] dimethylethyl carbinol | HCl / Iodine | 1 mole / 0.5 g | 150 | 11 |

The beneficial effect of the use of excess alcohol for the preparation of N-tertiary-alkylated (secondary) amines can be noted by an examination of Table 2. Represented in this table is a series of reactions of one mole of aniline in the presence of one mole of hydrochloric acid with varying amounts of tertiary-butyl alcohol. These reactions were carried out in five hours at 150° C. The results demonstrate that alcohol in excess of 2 moles per mole of amine produces improved yields of the monoalkylated aniline. This is a surprising result in view of previous disclosures where the use of excessive amounts of primary and secondary alcohols produced dialkylated amines.

TABLE 2

| Mole Ratio Aniline:tertiary-butyl alcohol | Percent Conversion |
|---|---|
| 1:1 | 20 |
| 1:2 | 27 |
| 1:3.5 | 59.5 |
| 1:4.65 | 62.2 |
| 1:30 | 61.7 |

While the invention should not be limited by the above examples, it should be understood that this invention is limited to the use of tertiary alcohols in conjunction with primary aromatic monoamines, and while tertiary butyl alcohol is preferred for use in alkylations, the process is applicable in the employment of higher tertiary alcohols and is particularly useful in conjunction with tertiary alcohols containing 4 to 8 carbon atoms. In general, the class of amines which can be used in this process are primary aromatic amines which may or may not be nuclearly substituted. Representative substituents which may be present on the ring without adversely affecting the process are alkyl (preferably 1 to 8 carbon atoms), aryl, cycloalkyl (5 to 6 carbon atoms), nitro, hydroxy, halogen, acyl, acyloxy, and alkoxy groups. These substituents should not be ortho to the amine group, however. We have found the unexpected result that ortho substitution tends to inhibit the alkylation of aromatic amine groups with tertiary alcohols and may entirely prevent the reaction from taking place. It is well known that in the alkylation of amines with primary alcohols such as ethyl alcohol, for example, ortho substitution seems to have little effect on the reaction, and compounds such as N,N-diethyl-o-toluidine can be prepared without difficulty.

In carrying out the invention, it is preferable to heat the reactants together in a closed vessel so that the pressure of the reaction is the autogenous pressure produced by the reaction mixture, thus the pressure produced will depend to a large extent on the proportions of reactants present as well as the temperature. When operating at high temperatures, say above 200° C., considerable decomposition of tertiary butyl alcohol to isobutylene may take place and thus elevate the pressure to above 600 pounds per square inch. We have found no beneficial or detrimental effect at operating at high or low pressures and, hence, we prefer to operate at the autogenous pressure of the reaction—although we may vent off isobutylene or other gases, or we may add pressure in the form of inert gases without unduly altering the preparation of desired products.

In the above examples the time of reaction in every case is 5 hours. Actually the time of reaction does not appear to be critical but rather depends upon the geometry of the reaction system, the quantities of materials used, the amount of agitation of the reactants, and so on, and to a lesser extent upon the nature of the reactants. We find in general the reactions can be completed in 1 to 24 hours, and the bulk of the reactions are completed in at least five hours. The optimum reaction time can be determined empirically very easily.

As can be seen from the results obtained in the examples, a variety of catalysts can be employed. The hydrohalogenic acids, HCl, HBr or HI can be used in ratios of .05:1 to 1.1:1 moles per mole of amine, with a preferred ratio of 1:1. Iodine can be employed as a catalyst alone in small amounts of .01 to 5% based on the weight of amine. At lower temperatures of 120°–140° C. a combination of hydrohalogenic acids in concentrations mentioned above in combination with iodine in preferred amounts of about 0.05% to 2% is particularly useful. Dehydrating mineral acids such as sulfuric acid and the oxy-acids of phosphorus such as phosphoric and phosphorous (0.1 to 4% based on amine) in combination with iodine (0.05 to 2%) may also be used as catalysts but do not appear to be as useful as the other catalysts mentioned. Too large a quantity of iodine may bring about excessive dehydration of the tertiary alcohol which, of course, is undesirable. The same reason limits the use of large proportions of sulfuric acid or the oxy-acids of phosphorus. The preferred catalysts are then the acids selected from the group HCl, HBr and HI alone or in conjunction with iodine. Of these acids hydrochloric acid is the most desirable to use because of its cost and ease of handling.

The acid catalysts may be added to the reaction mixture in a variety of ways, such as combined with part or all of the primary amine as the hydrochloride for example, or as a solution or mixture with the tertiary-alkyl alcohol. Generally we prefer to use the amine salts directly.

The ratio of tertiary alcohol to aromatic amine may be varied from 1:1 to as high as 30:1 or higher as will be observed in Table II but mole ratios of greater than 2:1 are preferred with optimum results being obtained at mole ratios of 3:1 to 6:1. Although a 30:1 ratio or even higher ratios bring about just as good conversions as this latter optimum range such high ratios only bring about waste of reaction vessel space.

The N-tertiary-alkylated secondary amines can be prepared at temperatures from 120°–220° C. Using the preferred catalysts, that is HCl, HBr, or HI alone or in combination with iodine in combination with the dehydrating mineral acids, the preferred temperature range is 140°–180° C.

The products prepared by this process as mentioned heretofore are especially useful as antioxidants. In addition we have made the surprising discovery that N-tertiary butyl aromatic amines are particularly stable to the effect of atmospheric oxygen as compared with the corresponding N-secondary-alkyl or N-normal-alkyl derivatives. Thus the N-tertiary-butyl derivatives may be termed oxygen resistant. For example, N-tertiary-butyl-p-aminophenol can be made into a 0.5% benzene solution and this solution exposed to daylight and air for two weeks without coloration. Freshly prepared solution of 0.5% N-n-butyl-p-aminophenol is not quite colorless and on exposure to light and air darkens rapidly in five or six days to produce a dark brown colored solution.

The antioxidant value of N-tertiary-butyl-p-aminophenol as compared with N-n-butyl-p-aminophenol (a standard gasoline antioxidant) can be observed in Table III where a Pennsylvania cracked gasoline was used in conjunction with these stabilizers in the standard oxygen bomb test (U. O. P.). The potency of the N-tertiary-butyl derivative is slightly greater than the potency of the N-n-butyl derivative.

TABLE III.—U. O. P. OXYGEN BOMB TEST

| Sample | Induction Period, Minutes |
|---|---|
| Cracked gasoline | 112 |
| Cracked gasoline+0.01% N-n-butyl-p-aminophenol | 900 |
| Cracked gasoline+0.01% N-tertiary-butyl-p-aminophenol | 1,012 |

Another compound of value is the N-tertiary-butyl-p-nitroaniline which is suited for the manufacture of mixed N-tertiary-butyl substituted diamines, that is, the nitro group may be converted to an amine group or an N-alkylated-amine group by known methods. The N-tertiary-butyl-p-nitroaniline is also valuable in preparation of dye intermediates particularly in view of the color stability of the amine group.

It will be observed from the examples that only mono-tertiary-alkyl aromatic amines are formed by this process, and not the dialkylated products or nuclearly alkylated products. Of course, there may be varying amounts of unreacted primary amines present in the crude products but these can be separated from the secondary amine products readily and reprocessed. The fact that no complexity of alkylated products results is of commercial advantage since the monoalkylated amines have great practical use as stabilizers.

The invention is advantageous to use as compared with the only known prior disclosures for producing tertiary-alkylated amines which demand the use of tertiary-butyl iodide, in that greater yields of desired products are effected at lower cost and in that large scale manufacture can be carried out with no reduction in yield of desired product.

Processes for production of N-tertiary alkylated aromatic secondary diamines such as N,N-di-tertiary butyl paraphenylenediamine are disclosed and claimed in our copending application Serial No. 218,261, filed on even date herewith.

What we claim as our invention is:

1. A process for producing N-tertiary alkylated aromatic secondary monoamines which comprises reacting one mole proportion of a carbocyclic aromatic primary monoamine with from 1 to 30 mole proportions of a saturated tertiary alkyl alcohol containing from 4 to 8 carbon atoms in the presence of a catalyst at a temperature of from 120° to 220° C., said aromatic monoamine containing from 6 to 15 carbon atoms and possessing other nuclear substituents which are in positions other than ortho to the —NH₂ group, which substituents are selected from the group consisting of a hydrogen atom, an alkyl radical containing from 1 to 8 carbon atoms, an aryl radical containing from 6 to 9 carbon atoms, a cycloalkyl radical containing from 5 to 6 carbon atoms, a nitro radical, a hydroxy radical, a halogen atom, a —CO—R radical, a —CO—OR radical and an —OR radical wherein each R represents an alkyl radical containing from 1 to 8 carbon atoms, said catalyst comprising at least one material selected from among those materials of the following subgroups (A) from about 0.05 to about 1.1 mole proportions of HCl, HBr and HI, (B) from about 0.01 to about 5% by weight based on the weight of the aromatic monoamine of iodine, (C) a combination of a material defined by subgroup (A) and the material defined by subgroup (B), (D) a combination of the material as defined by subgroup (B) and from about 0.1 to about 4% by weight based on the weight of the aromatic monoamine of sulfuric acid, (E) a combination of the material defined by subgroup (B) and from about 0.1 to about 4% by weight based on the weight of the aromatic monoamine of an oxyacid of phosphorous.

2. A process according to claim 1 in which the alcohol is tertiary butyl alcohol.

3. A process according to claim 1 in which the primary aromatic monoamine is aniline.

4. A process according to claim 1 in which the primary aromatic monoamine is p-aminophenol.

5. A process according to claim 1 in which the primary aromatic monoamine is 2-naphthylamine.

6. A process according to claim 1 in which the primary aromatic monoamine is p-nitroaniline.

7. A process of producing N-tertiary butyl aniline which comprises reacting a mole proportion of aniline hydrochloride with 3 to 6 mole proportions of tertiary butyl alcohol in the presence of 0.05 to 2 per cent of iodine, based on the weight of aniline present in the amine salt employed, at a temperature of 140° to 180° C.

8. A process of producing N-tertiary butyl-p-aminophenol which comprises reacting a mole proportion of p-aminophenol hydrochloride with 3 to 6 mole proportions of tertiary butyl alcohol in the presence of 0.05 to 2 per cent of iodine, based on the weight of p-aminophenol present in the amine salt employed, at a temperature of 140° to 180° C.

9. A process of producing N-tertiary butyl-2-naphthylamine which comprises reacting a mole proportion of 2-naphthylamine hydrochloride with 3 to 6 mole proportions of tertiary butyl alcohol in the presence of 0.05 to 2 per cent of iodine, based on the weight of 2-naphthylamine present in the amine salt employed, at a temperature of 140° to 180° C.

10. A process of producing N-tertiary butyl-p-nitroaniline which comprises reacting a mole proportion of p-nitroaniline with 3 to 6 mole proportions of tertiary butyl alcohol in the presence of 0.01 to 5 per cent of iodine, based on the weight of p-nitroaniline employed, at a temperature of 140° to 180° C.

References Cited in the file of this patent

UNITED STATES PATENTS

| Number | Name | Date |
| --- | --- | --- |
| 1,908,190 | Schollkopf | May 9, 1933 |
| 1,994,852 | Carleton et al. | Mar. 19, 1935 |
| 2,073,671 | Andrews | Mar. 16, 1937 |
| 2,084,977 | Rogers et al. | June 22, 1937 |
| 2,163,639 | Bramer et al. | June 27, 1939 |
| 2,198,260 | Melsen | Apr. 23, 1940 |
| 2,338,482 | Bean | Jan. 4, 1942 |
| 2,391,139 | Dickey et al. | Dec. 18, 1945 |
| 2,615,919 | Biswell | Oct. 28, 1952 |

FOREIGN PATENTS

| Number | Country | Date |
| --- | --- | --- |
| 501,844 | Great Britain | Mar. 1, 1939 |

OTHER REFERENCES

Sidgwick, "The Organic Chemistry of Nitrogen" (1942), p. 522.